(12) United States Patent
Baumgarten et al.

(10) Patent No.: US 9,405,793 B2
(45) Date of Patent: Aug. 2, 2016

(54) NATIVE LANGUAGE SUPPORT FOR INTRA-AND INTERLINKED DATA COLLECTIONS USING A MESH FRAMEWORK

(71) Applicants: Kai Baumgarten, Rauenberg (DE); Thilo Boehm, Heidelberg (DE); Karsten Bohlmann, Rauenberg (DE); Gerd G. Forstmann, Nussloch (DE); Christian Stork, Boenen (DE); Rolf Hammer, Karlsruhe (DE); Welf Walter, Ettingen (DE)

(72) Inventors: Kai Baumgarten, Rauenberg (DE); Thilo Boehm, Heidelberg (DE); Karsten Bohlmann, Rauenberg (DE); Gerd G. Forstmann, Nussloch (DE); Christian Stork, Boenen (DE); Rolf Hammer, Karlsruhe (DE); Welf Walter, Ettingen (DE)

(73) Assignee: SAP SE, Walldorf (DE)

( * ) Notice: Subject to any disclaimer, the term of this patent is extended or adjusted under 35 U.S.C. 154(b) by 419 days.

(21) Appl. No.: 13/916,509

(22) Filed: Jun. 12, 2013

(65) Prior Publication Data

US 2014/0372398 A1      Dec. 18, 2014

(51) Int. Cl.
*G06F 17/30* (2006.01)

(52) U.S. Cl.
CPC .............................. *G06F 17/30386* (2013.01)

(58) Field of Classification Search
CPC ................... G06F 17/30386; G06F 17/30864; G06F 17/30424; G06F 17/30569; G06F 17/30595; G06F 17/30604
See application file for complete search history.

(56) References Cited

U.S. PATENT DOCUMENTS

| | | | |
|---|---|---|---|
| 6,741,982 B2 | 5/2004 | Soderstrom et al. | |
| 6,842,757 B1 | 1/2005 | Winer et al. | |
| 7,516,090 B2 | 4/2009 | Agarwal | |
| 7,840,175 B2 | 11/2010 | Hochwarth et al. | |
| 8,005,807 B2 | 8/2011 | Nouri et al. | |
| 8,156,134 B2 | 4/2012 | Sun et al. | |
| 8,219,561 B2 | 7/2012 | Stork et al. | |
| 8,239,373 B2 | 8/2012 | Sthanikam et al. | |
| 8,387,030 B2 | 2/2013 | Brunswig et al. | |
| 8,527,451 B2 | 9/2013 | Heidasch | |
| 8,666,845 B2 | 3/2014 | Sachs et al. | |
| 2003/0041071 A1* | 2/2003 | Wakai ............... | G06F 17/30595 707/999.103 |
| 2009/0112908 A1* | 4/2009 | Wintel ............... | G06F 17/30575 707/999.102 |
| 2010/0153933 A1 | 6/2010 | Bohlmann et al. | |
| 2011/0314457 A1* | 12/2011 | Schaude ............ | G06F 9/4423 717/139 |
| 2013/0111277 A1 | 5/2013 | Klemenz et al. | |
| 2013/0124611 A1 | 5/2013 | Thormaehlen et al. | |
| 2013/0132351 A1 | 5/2013 | Richter | |
| 2013/0139081 A1 | 5/2013 | Alon et al. | |
| 2013/0144741 A1 | 6/2013 | Becker et al. | |
| 2013/0151463 A1 | 6/2013 | Ritter et al. | |
| 2013/0159146 A1 | 6/2013 | Schmitt et al. | |

(Continued)

*Primary Examiner* — Dinku Gebresenbet
(74) *Attorney, Agent, or Firm* — Mintz Levin Cohn Ferris Glovsky and Popeo, P.C.

(57) ABSTRACT

A mesh structure can be a type concept that extends internal tables or other data structures of a business programming languages (e.g., ABAP) by associations, as known from a data object meta-model. A mesh can include a set of operations, such as for example iteration via an iterator object and selection of instances expressed by a path language. A mesh structure can be optimized for read access and traversal, and can provide a working area that is processed with statements in the business programming language to implement one or more core services directly from the mesh data structure. Related methods, computer program products, and systems are described.

19 Claims, 18 Drawing Sheets

(56) References Cited

U.S. PATENT DOCUMENTS

| | | |
|---|---|---|
| 2013/0159378 A1 | 6/2013 | Misovski et al. |
| 2013/0159897 A1 | 6/2013 | Misovski et al. |
| 2013/0159926 A1 | 6/2013 | Vainer et al. |
| 2013/0159981 A1 | 6/2013 | Klemenz et al. |
| 2013/0159984 A1 | 6/2013 | Misovski et al. |
| 2013/0159993 A1 | 6/2013 | Misovski et al. |
| 2013/0166602 A1 | 6/2013 | Brunswig et al. |
| 2013/0166675 A1 | 6/2013 | Giebel et al. |
| 2013/0179797 A1 | 7/2013 | Vollrath et al. |
| 2013/0191820 A1 | 7/2013 | Jahr et al. |
| 2014/0046972 A1 | 2/2014 | Xue et al. |
| 2014/0136274 A1 | 5/2014 | Kieselbach et al. |
| 2014/0164425 A1 | 6/2014 | Gruenhagen et al. |

* cited by examiner

| ID | Surname 302 | Prename | Title 304 |
|---|---|---|---|
| 101 | Smith | Anton | Mr |
| 102 | Smith | Aaro | Ms |
| 103 | Mustermann | Erika | Frau |
| 104 | Mustermann | Hasel | Herr |

```
FOR EACH lo_iter IN MESH lo_mesh.
    ...
    lv_text = lo_iter->description.
    ...
ENDFOR.
```
                                                                500

FIG. 5A

```
CREATE OBJECT lo_selector EXPORTING
    io_mesh = lo_mesh
    iv_path = '\\SalesOrder\toitems[status = iv_status]'.
    ...
FOR EACH lo_iter USING SELECTOR lo_selector->where( iv_status = 'A' ).
    ...
ENDFOR.
```
                                                                530

FIG. 5B

```
DATA lo_mesh TYPE REF TO mesh.
```
                                                                560

FIG. 5C

```
INTERFACE it_person_iterator.
  INTERFACES it_mesh_iterator.
  DATA name  TYPE string.
  DATA title TYPE ty_title.
ENDINTERFACE.
```

*FIG. 6A*

```
CREATE ITERATOR lo_contact MESH LIKE lo_mesh NODE ('Persons')
       BINDING name  TO ('Surname')
               title TO ('Title').
```

*FIG. 6B*

```
CREATE ITERATOR lo_person MESH LIKE lo_mesh NODE ('PERSONS').
```

*FIG. 6C*

```
CREATE ITERATOR lo_contact MESH LIKE lo_mesh NODE ('Persons')
BINDING name TO ('Surname') ##PARTIAL BINDING OK.
```
*FIG. 7A*

```
CREATE ITERATOR lo_contact2 LIKE lo_contact.
```
*FIG. 7B*

```
CREATE ITERATOR lo_contact MESH LIKE lo_mesh NODE (lv_nodename)
BINDING FROM TABLE lt_binding_table.
```
*FIG. 7C*

```
CREATE ITERATOR lo_iter_itm MESH LIKE lo_mesh NODE ('ITEMS')
  BINDING item_id TO ('Id')
          prod_name TO ('\to_Product-Name').
```
*FIG. 8A*

```
... BINDING attr TO ('\relation1\relation2-sub_struc-component')
```
*FIG. 8B*

```
CREATE ITERATOR lo_iteritm MESH LIKE lo_mesh NODE ('ITEMS')
  BINDING size TO ('\ToProduct-size') DEFAULT '-1'.
```

```
CREATE ITERATOR lo_iterperson MESH LIKE lo_mesh NODE ('PERSONS')
  BINDING name  TO ('`Surname`')
          title VALUE `Mr/Ms`
          title_of_nobility VALUE IS INITIAL.
```

```
IF lo_iter->it_mesh_iterator-is_assigned( ) = abap_false.
```
1000

FIG. 10A

```
FOR EACH lo_iter IN MESH lo_mesh.
    ASSERT lo_iter->it_mesh_iterator-is_assigned( ) = abap_true.
ENDFOR.
ASSERT lo_iter->it_mesh_iterator-is_assigned( ) = abap_false.
```
1030

FIG. 10B

```
FOR EACH lo_iter IN MESH lo_mesh.
    IF lo_iter->value > lv_max.
        lv_max = lo_iter->value.
        lo_iter_max->it_mesh_iterator-assign_from_iterator( lo_iter ).
    ENDIF.
ENDFOR.
```
1060

FIG. 10C

```
IF it_mesh_iterator->same_node_instance(
        io_iter1  lo_iter_max
        io_iter2  lo_iter ) = ABAP_TRUE.
    ...
ENDIF.
```
1090

FIG. 10D

```
DATA lr_line_ref TYPE REF TO DATA.
lr_line_ref = lo_mesh->get_instance( lo_iter ).
```
                                                    1100

FIG. 11A

```
lo_mesh->copy_instance( exporting io_iter = lo_iter
                        importing es_line = <work_area> ).
```
                                                    1130

FIG. 11B

```
FOR EACH lo_iter IN MESH NODE ORDER.
  ...
ENDFOR.
```
                                                    1160

FIG. 11C

```
CREATE OBJECT lo_selector
    EXPORTING
        io_mesh = lo_mesh.
        iv_path = '\\ Header [ ID = N'4711' ] \ Items'.

FOR EACH lo_iter USING SELECTOR lo_selector.
    ...
ENDFOR.
```

FIG. 12A

```
lo_iter->assign_from_selector( lo_selector ).
```

FIG. 12B

```
DATA lo_sel_item TYPE REF TO cl_mesh_absolute_selector.
CREATE OBJECT lo_sel_item
  EXPORTING
    io_mesh = lo_mesh
    iv_path = '\\ Header [ID = N''4711'']\Items'.

FOR EACH lo_iter_item USING SELECTOR lo_sel_item.
ENDFOR.
```

FIG. 13A

```
lo_selector->set_mesh( lo_other_mesh ).
```

FIG. 13B

```
DATA lo_header_sel TYPE REF TO cl_mesh_absolute_selector.
DATA lo_item_sel   TYPE REF TO cl_mesh_empty_relative_selector.

CREATE ITERATOR lo_iter_header ....
CREATE ITERATOR lo_iter_item ....

CREATE OBJECT lo_header_sel EXPORTING
  io_mesh = lo_mesh
  iv_path = '/\Header'.

CREATE OBJECT lo_item_sel EXPORTING
  io_start_iterator = lo_iter_header
  iv_path           = '/\Items'.

FOR EACH lo_iter_header USING SELECTOR lo_header_sel.
  ... " process header
  FOR EACH lo_iter_item USING SELECTOR lo_item_sel.
    ... " process item
  ENDFOR.
ENDFOR.
```

*FIG. 14*

```
CLASS lcl_my_sel DEFINITION INHERITING FROM cl_mesh_absolute_selector.
  PUBLIC SECTION.
    METHODS where
      IMPORTING iv_id TYPE t_my_id
      RETURNING VALUE(ro_me) TYPE REF TO lcl_my_sel.
  PRIVATE SECTION.
    DATA mv_id TYPE t_my_id.
ENDCLASS.

CLASS cl_my_selector IMPLEMENTATION.
  METHOD where.
    mv_id = iv_id.
    ro_me = me.
  ENDMETHOD.
ENDCLASS.
```

```
CLASS lcl_my_sel DEFINITION INHERITING FROM cl_mesh_absolute_selector.
  PUBLIC SECTION.
    METHODS where
      IMPORTING iv_id TYPE t_my_id
      RETURNING VALUE(ro_me) TYPE REF TO lcl_my_sel.
  PRIVATE SECTION.
    DATA mv_id TYPE t_my_id.
ENDCLASS.

CLASS cl_my_selector IMPLEMENTATION.
  METHOD where.
    mv_id = iv_id.
    ro_me = me.
  ENDMETHOD.
ENDCLASS.
```
1600

*FIG. 16A*

```
FOR EACH lo_iter_hdr USING SELECTOR lo_selector->where( iv_id = 4711 ).
ENDFOR.
```
1630

*FIG. 16B*

NATIVE LANGUAGE SUPPORT FOR INTRA- AND INTERLINKED DATA COLLECTIONS USING A MESH FRAMEWORK

TECHNICAL FIELD

The subject matter described herein relates to a mesh framework for use with a business programming language, such as for example the advanced business application programming (ABAP) language.

BACKGROUND

Business-relevant data, such as for example data retained and used by enterprise resource planning (ERP) systems and other business software applications, can be represented as collections of entities that are characterized by intra- and inter-collection links. The entities can be data objects, such as for example business objects, and can include collections of data object nodes (for example, business object nodes). Associations between the nodes in a same collection or data object can be referred to intra-collection associations or links, and associations between nodes in different collections or objects can be referred to as inter-collection associations or links.

Some business programming languages, such as for example the Advanced Business Application Programming (ABAP) language, lack native support for data associations between nodes of different data objects (e.g., business objects). Instead, application developers have historically implemented various frameworks on top of the language layer to simulate support for these associations. Such frameworks inherently introduce a higher level of complexity and generate overhead which leads to performance decrease of the productive system. Frameworks are generally incapable of achieving the same reduction of development effort and maintenance costs as native support for such features could provide.

SUMMARY

In one aspect, a method includes storing semantically grouped data from a plurality of nodes of two or more business objects in a mesh structure comprising a single data object implemented natively within a business programming language, and providing a working area that is processed with statements in the business programming language to implement one or more core services directly from the mesh structure. The working area is provide via the mesh structure. The method further includes supporting links between two or more nodes of the plurality of nodes via coded path expressions that are included in a definition of the mesh structure and allowing retrieval, from a relational database underlying the two or more business objects, of data from the plurality of nodes of the two or more business objects via the mesh structure.

In some variations one or more of the following features can optionally be included in any feasible combination. The business programming language can include or be ABAP, the Advanced Business Programming Language. The mesh structure can store the semantically grouped data in application memory during runtime. The one or more core services can be implemented directly at a mesh level of the mesh structure without requiring an additional processing framework coded on top of the mesh structure. The one or more core services can include one or more of an iterator function and a selector function.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 shows a diagram illustrating an example of iterator functionality consistent with implementations of the current subject matter;

FIG. 5A, FIG. 5B, FIG. 5C, FIG. 6A, FIG. 6B, FIG. 6C, FIG. 7A, FIG. 7B, FIG. 7C, FIG. 8A, FIG. 8B, FIG. 9A, FIG. 9B, FIG. 10A, FIG. 10B, FIG. 10C, FIG. 10D, FIG. 11A, FIG. 11B, FIG. 11C, FIG. 12A, FIG. 12B, FIG. 13A, FIG. 13B, FIG. 14, FIG. 15, FIG. 16A, and FIG. 16B show code snippets illustrative of example implementations of the current subject matter;

When practical, similar reference numbers denote similar structures, features, or elements.

DETAILED DESCRIPTION

To address the issues described above and potentially other issues with currently available solutions, methods, systems, articles of manufacture, and the like, one or more implementations of the current subject matter can, among other possible advantages, provide an ability to store semantically grouped data from different data object nodes into a single data object. Such features can improve the suitability of the Advanced Business Application Programming (ABAP) platform as a vehicle for modern framework-based application development, for example, by enabling an enhanced development experience that provides higher-level language features (e.g., syntax highlighting, code completion, and the like).

Implementations of the current subject matter can include a working area, which can be processed with native language (e.g., ABAP) statements without the need to call costly framework functionality, such as, for example, enterprise services framework (ESF) business object (BO) core services or the like. Integrated support can be provided for intra- and inter-collection links by path expressions. Implementations of the current subject matter can also provide functionality that serves as a result set for retrieval of data from multiple business object nodes from a relational database. This approach can reduce the number of calls to the database, independent of whether it is a disk based or an in-memory database.

The addition of meshes and mesh processing to a business programming language (e.g., ABAP) can provide various advantages as explained in further detail herein. Improved performance and an enhanced programming experience can lead to reduced maintenance efforts.

Figure 1:
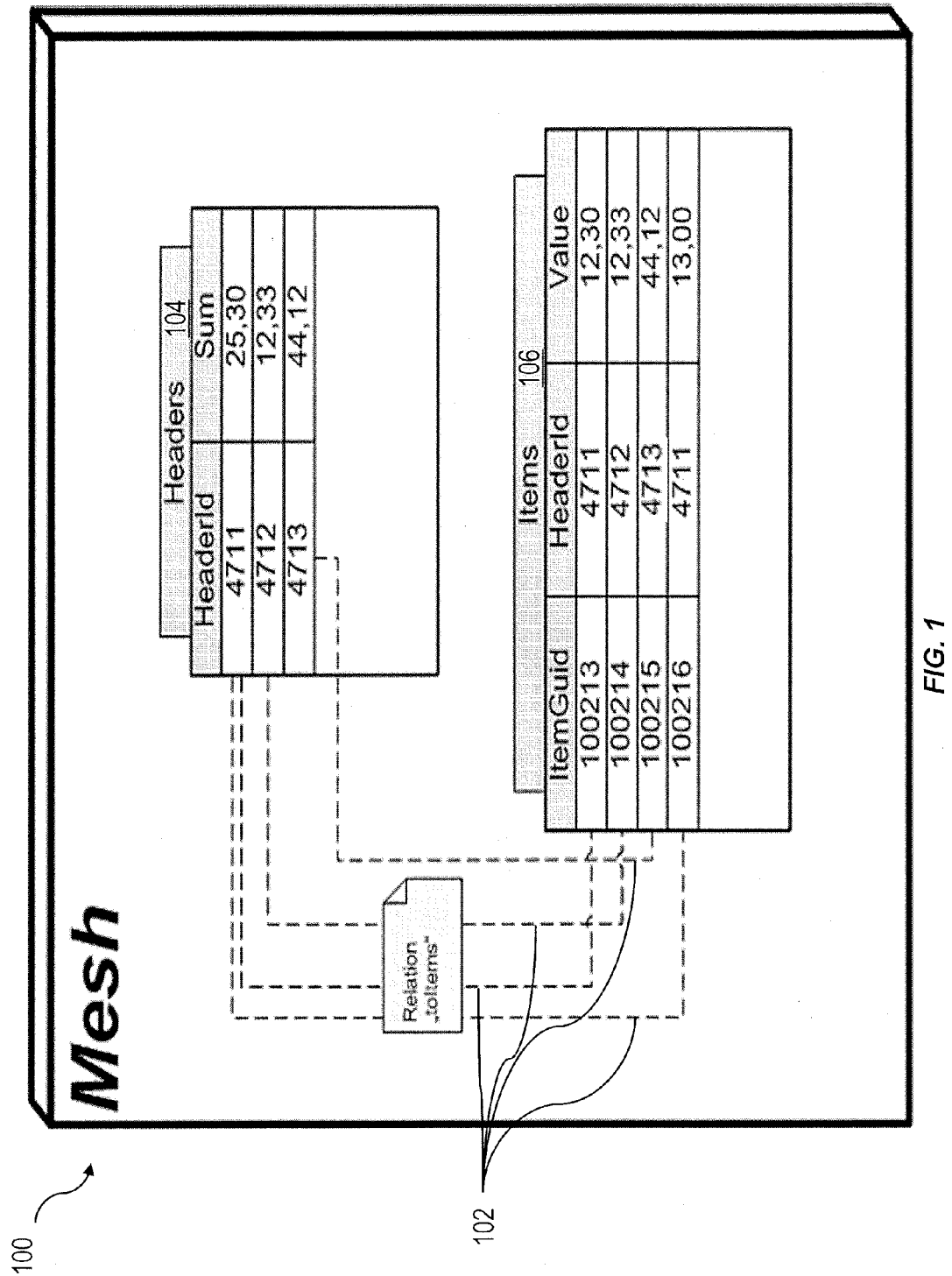
FIG. 1 shows a diagram illustrating examples of inter-table associations.

A business software mesh as used herein includes a type concept that extends internal tables of a business programming language (e.g., ABAP) using associations. An internal table, as used herein, refers to dynamic data objects used for transferring data from a fixed structure to working memory in support of business application operations. One use for internal tables is storing and formatting data from a database table within an executing program. An example of associations is shown in the diagram 100 of FIG. 1. The associations 102 can be known or derived from a business object meta-model or other data object meta-model (e.g., a definition of the links, associations, dependencies, etc., between data structures). In the example of FIG. 1, associations 102 link entries in a "headers" table 104 to entries in an "items" table 106. In this example, the items table 106 has associations with the headers table 104 due to links between the header id in the headers table 104 and the items in the items table 106.

Figure 2:
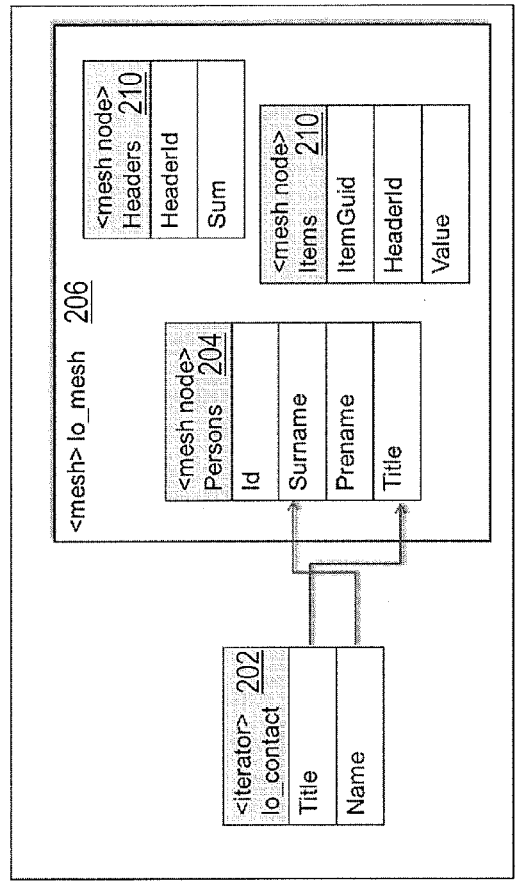
FIG. 2 shows a diagram illustrating an example of a mesh structure consistent with implementations of the current subject matter.

FIG. 2 shows a diagram 200 illustrating binding of the two attributes of an iterator lo_contact 202 to the attributes of the node Persons 204 in the mesh lo_mesh 206. The mesh contains two other nodes 210, 212, which are not involved in the binding. Iterators are discussed in more detail below. As depicted, a mesh is a data container having internal tables, which have connecting relations. The internal tables are similar to database tables, but are used for presentation of content, such as for example data stored inside an application server, rather than in the database underlying a business application or the like. The linking of internal tables within a mesh by associations can make navigation between entries in one internal table to entries in another internal table quite easy. Because the links between the tables are known (defined in the mesh definition) at compile time and implemented at runtime according to the mesh definition, selects or expensive operations to link data are not necessary. Programming of a similar structure within a business programming language such as ABAP that lacks features of the current subject matter can require a series of complicated and expensive joins or other operations.

Another advantage of a mesh consistent with implementations of the current subject matter is that key columns used in joins are detected automatically and need not be entered by a user (designer). If a similar structure were programmed using a business programming language, these key columns would require explicit call-outs. Instead, in a mesh as described herein, a key (e.g. an index, etc.) is automatically detected by defining a relation between nodes.

FIG. 3 shows an example table 300 in which an iterator is bound to the attributes "Surname" 302 and "Title" 304. In each loop step 306, only these attributes can be accessed. The view is specified when the iterator object is created, and the instance in the mesh is assigned in the FOR EACH iteration. In this example, iteration occurs over the data set by looping over all of the values. However, only some of the concepts in the data set are interesting in a current context. Accordingly, the iterator does not access the "uninteresting" data relative to the current context. A same iterator can be used on other tables having the same dimensions. In effect, the definition of an iterator can express one or more expectations on a table.

Figure 4:
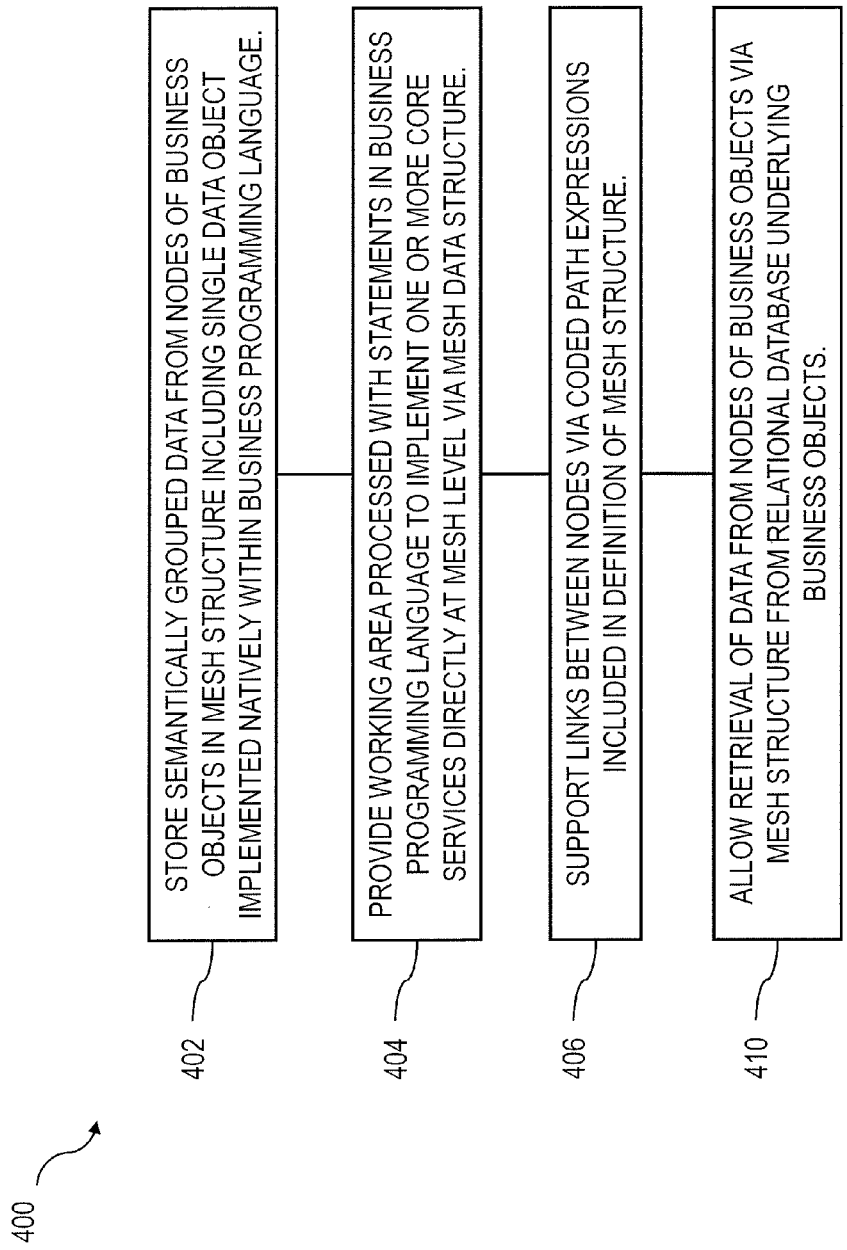
FIG. 4 shows a process flow diagram illustrating aspects of a method having one or more features consistent with implementations of the current subject matter.

FIG. 4 shows a process flow chart 400 illustrating features of a method consistent with one or more implementations of the current subject matter. At 402, semantically grouped data from a plurality of nodes of two or more business objects are stored into mesh structure that includes a single data object. The data object can be implemented natively within a business programming language (e.g., ABAP) and can have one or more of the features as discussed below. At 404, the mesh (single data object) provides a working area that is processed with business programming language statements without the need to call processor-intensive framework functionality (e.g., an additional processing framework coded on top of the mesh structure), such as, for example, enterprise services framework business object core services. Support for links between two or more nodes of the plurality of nodes is provided by the single data object via coded path expressions at 406. The coded path expressions can be included in a definition of the mesh structure. In this manner, at 410 the mesh structure serves as a result set for retrieval of data from the plurality of business object nodes from the relational database. This approach can reduce the number of calls to the underlying relational database, independent of whether it is a disk based or an in-memory database.

A mesh can include a set of operations, most notably iteration, which introduces a related type concept referred to herein as an iterator object. Selection of instances can be expressed by a path language. A mesh consistent with implementations of the current subject matter can be optimized for read access and traversal. Advantageously, a mesh cannot be changed. However, a new mesh can be derived from an existing mesh by manipulating operations.

In multi-layered software architectures, such as, for example, in enterprise resource planning (ERP) frameworks or the like, the same data can be represented differently per layer. With a mesh consistent with implementations of the current subject matter, structured types can be adapted and exposed via an adaptor interface. Such an interface can allow a compile time type-checked data access. Higher layers can directly access data in another layer without compromising the information hiding principle. This avoids the necessity of copying of the data from one representation to another. A binding expression consistent with implementations of the current subject matter can include multiple steps, which would be cumbersome to express in currently available business programming languages such as ABAP. As used herein, a binding expression is an expression of an association between two data structures, nodes or data structures, or the like.

An adaptation need not be preconceived by the underlying data type (in contrast to structure inclusion, interface implementation, etc.). Adaptation can be a reference semantic model to avoid copy costs. Changes are generally not possible for a read-only mesh. The underlying (root) entity of an adapter can be changed without losing its binding. This approach can be an efficient operation, for example as compared to reassigning a set of data references. Thus, the adaptation of collection can be a one-time operation.

A path language can be included to express complex accesses, such as, for example, navigation through relations in a concise manner. As an example, a path expression can be as follows: \\entity\relation[filter]\relation[filter]\ . . . \

A container iteration implicitly having set-semantics can also be included. For example, instances can be visited in undefined order. For parallel processing, this capability is mandatory. Distinct path navigation can be provided. For example, within each navigation step along a relation, duplicates can be eliminated from the intermediate working set.

In short, implementations of the current subject matter can provide an improved approach to handling relational object graphs leveraging the performance of internal tables or other data structures or features of data structures such as business objects. A mesh consistent with implementations of the current subject matter can create or include a data container for storing entity collections, and can do so significantly more efficiently than a graph of objects and more conveniently than an implementation based on links between internal tables, references, associations, and the like that are coded in the business programming language. From a developer's perspective, the mesh concept, as well as the related iterator concept, can appear as object-oriented constructs requiring a limited number of new language constructs.

A mesh type can optionally correspond to the nodes and associations of a Business Object (BO). In particular, a mesh can span multiple BOs, such as for example purchase orders and associated customers and associated products. The construction of such mesh types can follow from the required business processing of BO data, which can typically involve multiple BOs at a time. However, a mesh consistent with implementations of the current subject matter can also be used completely independently from BOs, for example, in the same way that internal tables are not tied to database tables, for all kinds of business programming language (e.g., ABAP) applications that require highly efficient, complex structured data.

The mesh concept is compatible with the newly described query language ABQL (Advanced Business Query Language) that facilitates the retrieval of data, relevant for the current business process, from multiple (foreign-key related) tables at once. It avoids multiplying joins into a single large flat table. By filling the query result into a mesh, the result items can be kept in homogeneous entity collections. These homogeneous entity collections can retain any existing foreign-key relations.

A specific instance of a mesh is an instance of a mesh type. Its representation for a developer (e.g., an ABAP developer) can be an instance of an objects class (e.g., an ABAP objects class). The mesh type is an implicit entity, which includes the type information of a mesh. A mesh type can include a number of nodes and one or more relations between those nodes. A node has a unique name within the mesh type and can include a number of attributes that belong together. An instance of a node can be referred to as an instance. An attribute has a name and an elementary or flat structured type. For example, in an ABAP mesh, the attribute has a flat structured ABAP type, meaning that nested tables are not allowed. Line types with references can also be disallowed in an ABAP mesh. The name of an attribute is unique within a node. A relation connects two nodes with a given direction and has a name that is unique in the namespace of the source node. A relation defines a condition for the attributes of the two nodes. If this condition is satisfied for two instances, there is a link between them.

A mesh, as an instance of a mesh type, can include an instance collection for each node of the mesh type. A programming language virtual machine (e.g., an ABAP virtual machine or VM) can use internal tables to implement instance collections. As links are defined through the node attribute values, there is no need for a storage mechanism of link instances. Navigation along relations can be accelerated by internally added secondary keys.

ABAP combines the safety and robustness of an enterprise virtual machine environment with the flexibility of several aspects of dynamic languages. Today's business applications are often written using layer-based frameworks. Those frameworks typically use dynamic processing in order to avoid program generation. Hence, the focus is to improve the "dynamic" or "generic" processing, which comes at the cost of additional run-time checks to retain the required robustness and type safety.

A mesh type can be statically defined in the business programming language (e.g., ABAP) source code. In other words, the list of nodes and relations can be provided in a declaration of the mesh and is therefore already known at compile time. If the list of nodes and relations is provided at runtime, the mesh is called a dynamic mesh. The compiler can be agnostic to its nodes and relations.

The mesh concept attempts to alleviate the overhead of generic coding compared to statically typed code by allowing separation of a "binding" step from iteration, thus allowing movement of the binding outside of a loop and reducing the number of typechecks; by introducing the iterator as a collection of statically typed attributes, which are easier to handle than individual field-symbols; by introducing the binding expression for expressing several read-table with key statements in a compact notation; and by offering a pure read-only data structure. Thus, a dynamic mesh concept offers a significant improvement compared to the current methods for generic programming in business programming languages such as ABAP.

One important operation on a mesh is iteration over its node instances. Mesh iteration can use a new statement FOR EACH, which goes beyond the ABAP statement LOOP AT . . . ASSIGNING . . . by introducing an iterator concept that provides better abstraction and higher performance potential than the field-symbol mechanism. As shown in the code snippet 500 of FIG. 5A, lo_mesh is a variable holding a reference to a mesh, and the iterator reference variable lo_iter is used in the body of the FOR statement to access the attribute description of the instances in the mesh.

While iteration on internal tables provides only a WHERE condition on the line type, filtered iteration on meshes generalizes to selectors using path expressions, making use of the defined relations to navigate between nodes as shown in the code snippet 530 of FIG. 5B. The selector lo_selector selects all nodes for which there is a relation to Items from an instance in SalesOrder and whose attribute status has the value 'A'. The iterator lo_iter is used to access the attributes of those instances. A mesh can be an ABAP object of a system class MESH, for example as shown in the code snippet 560 of FIG. 5C. Meshes are immutable value objects. This means, any "changing" operation on a mesh creates a new mesh object; it does not modify the original mesh object.

One option for mesh creation is to perform a SELECT statement using a query, for example, a query formulated in the advanced business query language (ABQL). In this case, the selected nodes and the relations connecting them become the content of the mesh. Another possibility to create a mesh is to perform a set of application programming interface (API) calls. A mesh can be created from a previous mesh by adding or replacing an internal table. The construction starts with a given empty mesh. Examples of API methods to "manipulate" a mesh can include mesh=>empty_mesh (an empty mesh to start from), mesh→add_node (returns a mesh with an additional, filled node), mesh→replace_node (returns a mesh of the same type, but the content of one node is exchanged with the content of another table—the exchanged table has an identical type), mesh→add_relation (returns a mesh with an additional relation), mesh→drop_node(node_name) (returns a mesh omitting a designated node), mesh→drop_relation(node_name relation_name) (returns a mesh omitting a designated relation), and mesh→get_node(exporting name=' . . . ' importing table=lt_itab) ("copies" a designated node out of the mesh into an internal table). Due to table sharing, no real copy is required. Table sharing is a feature of the ABAP language, where the data duplication needed for a copy of an Internal Table is delayed until a subsequent write access ("copy on write semantics").

If there are iterators pointing into a mesh, they are still valid after a "modification" as they are simple pointing into the old mesh. This high number of copy steps is only possible due to the table sharing which leads to a fast mesh copy. All table types allowed in a mesh can be shared, since nested tables are not allowed.

A node maps a legal ABAP identifier name (a subset of the regular expression [A-Z_/][A-Z0-9_/]{0,29}) to an internal table. The node name is not case-sensitive and translated to upper case. The internal table is a table with a structured line type. A node spans a namespace for relations in the mesh. A node spans a separate namespace for its attributes. Attributes of a node are components of the line type of the associated internal table.

A relation as used herein connects two nodes by specifying a condition that can be satisfied by two instances. As with nodes names, a relation name must be unique in the namespace of its source node. The rationale for this is that there may be multiple nodes in the mesh having a relation with the same name (e.g. "PARENT" or "ITEM"). A link as a manifestation of a relation between two node instances exists if the relation condition is satisfied. A relation condition is a list of pairs of attribute names whose attribute values have to be equal in the source and the result node. The attribute types must be compatible.

Consistent with some implementations of the current subject matter, the above concept can be extended to specify constant values on one side to support simple filtered relations; specify a list of constant values and/or comparison operators, dynamically specified constant values or sets of values, composed relations as a chain of other relations (e.g. relation grandchildren:=relation children of relation children), composed relations as union of other relations (e.g. relation children:=relation sons union relation daughters); or the like.

A mesh type can include a normalized list of node names with the exact type of the table, and a normalized list of relations for each node together with their conditions. As used herein, normalizing means that those lists are lexicographically sorted.

No separate entity "mesh type" is required to describe a dynamic mesh. Instead, the mesh type can inherently be a part of a mesh instance, represented by an object, such as for example an ABAP object. Two mesh instances can have the same type. In this case those mesh instances are compatible.

A mesh can offer the following introspection methods: lo_mesh→get_node_names( ), returns the names of the nodes in the mesh; lo_mesh→get_relation_names(iv_node_name), which returns the names of the relations of the given node; lo_mesh→get_node_info(iv_node_name), which returns node information; lo_mesh→get_relation_info(iv_node_name iv_relation_name), which returns the details of one relation; and lo_mesh→get_all_infos(et_node_infos et_relation_infos), which returns information on all nodes and all relations.

Newly created meshes can be allocated in the internal session. There is no possibility (and no need) to create a mesh explicitly in a shared objects area. As used herein, a shared objects area refers to a segment of shared memory in which instances of classes and anonymous data objects can be stored. Named data objects can be stored as attributes of classes. If a mesh is referenced from a shared objects area, the mesh will be automatically copied to this shared objects area during the detach_commit. Therefore, meshes can behave like other value types (e.g. strings). No exception is raised as it is done for "normal" object references.

If the internal tables of a mesh are already allocated in the shared objects area, the copy costs for those are avoided. To force that the internal tables implicitly created by an ABQL statement are allocated in a shared objects area, the shared objects area can be specified by a hint.

One operation on a mesh is iteration over its node instances. Mesh iteration uses a new statement FOR EACH, which goes beyond the ABAP statement LOOP AT . . . ASSIGNING . . . by introducing an iterator concept that provides better abstraction and higher performance potential than the field-symbol mechanism. Referring again to the code snippet 500 of FIG. 5A, an example of an iteration through a mesh is depicted. In this example, lo_mesh is a variable holding a mesh, and lo_iter is the iterator variable which visits the selected instances. An iterator is a kind of reference to a node instance. The attribute description can be accessed via the arrow operator "→".

An iterator can be seen as a stencil that can quickly be put on a specific instance of a node to provide a view on that instance. An iterator can combine information regarding what view to provide on a mesh node (vertical projection) and which instance of a mesh node is referenced (horizontal selection).

Concrete application code usually has a specific notion of the instance attributes that an iterator should give access to. Therefore, it can contain specific iterator interface type definitions.

An iterator interface is a special kind of an ABAP interface in the same way that exception classes are a special kind of ABAP classes. It contains a list of attributes that can be accessed via the iterator variable. FIG. 6A shows an example code snippet 600 depicting the definition of the iterator interface type it_person_iterator, which has two attributes: name and title.

The DATA statements in a normal ABAP objects interface define a continuous piece of the memory layout of an implementing class. In contrast to this, the DATA statements in the mesh iterator interface define the attributes, which can be accessed in a type-safe manner via the iterator object. This uniqueness makes it possible to bind the single attribute to non-adjacent memory addresses. The iterator interface has to include the interface it_mesh_iterator. For technical reasons, this must be the first statement in the interface definition. This transforms a "normal" interface to an iterator interface.

A mesh iterator interface generally cannot be implemented by an ABAP objects class. For such an iterator interface, an opaque implementation class can be generated automatically. An iterator is an interface reference to such an iterator interface, such as for example: DATA lo_iter_person TYPE REF TO it_person_iterator. Such an interface can also be a globally visible interface, for example one that can be defined in the class builder of an ABAP workbench or the like. An ABAP workbench or comparable functionality can include one or more tools for editing programs. These one or more tools can include one or more of an editor for writing and editing reports, module pools, etc.; a dictionary for processing database table definitions and retrieving global types; a menu painter for designing a user interface; a screen painter for designing screens and flow logic; a function builder for function modules; a class builder for ABAP objects classes and interfaces; and the like. The iterator object implies an indirection in addressing. Each attribute actually refers to a component of a line of an internal table in the mesh. An attribute is always a read-only reference to the component of the instance in the mesh.

It is not necessary that the iterator attribute name is equal to the node attribute's name. For instance, a generic service can be designed to work with two specific attributes (for which it also expects certain types). However, the generic service is applicable to several BO nodes having the attributes of the required types, but different names.

Binding of all iterator attributes to node attributes can be required and specified in the new iterator creation statement, as shown in the code snippet 630 of FIG. 6B, in which the mesh lo_mesh has a node named 'Persons' which has the attributes 'Surname' and 'Title' of appropriate type. Node attribute names can be case-insensitive like node names.

The component names of the nodes can be specified dynamically because at compile-time the mesh type is not known. The name can be given by a string variable, rather than by a literal. For convenience, if some iterator attribute is not mentioned in the BINDING clause, it can be bound to a node attribute with the same name. If the node does not have an attribute of that name with a compatible type, an exception is raised. So, for easy use cases the BINDING clause can even be omitted. All iterator attributes can be bound to corresponding node attributes, as shown in the code snippet 660 of FIG. 6C.

The invalidation of binding clauses in existing code through the extension of an iterator interface by an additional attribute is advantageously avoided. If some but not all attributes are mentioned in the BINDING clause, a syntax warning can be raised as a reminder to check the code.

In some implementations of the current subject matter, if the developer intentionally chooses to make a partial binding, the warning can be suppressed by adding the pragma ##PARTIAL_BINDING_OK, for example, as shown in the code snippet 700 of FIG. 7A. The binding can also be derived from an already existing iterator, for example, as shown in the code snippet 730 of FIG. 7B. For generic use cases, an internal table can be specified, for example as shown in the code snippet 760 of FIG. 7C. Generally, for a binding via a binding table, all attributes can be required to be explicitly bound.

At creation time, it is generally necessary only to know the mesh type. However, a mesh instance can be necessary to carry the mesh type. For the iteration discussed above, a different mesh instance can be given. This different mesh type is compatible to the mesh instance which was used in the iterator creation. The number of binding steps can be reduced by reusing an iterator object. This feature can be advantageous for nested iterations.

Attributes of an iterator may be bound to components of multiple nodes by following single-cardinality-relations: attributes of the related node can be "pulled into" the iterator as so-called virtual attributes. Iteration over the main node can imply lockstep iterations over the nodes containing virtual attributes bound in the iterator. FIG. 8A shows a code snippet 800 depicting an example of an iterator creation with a virtual attribute prod_name. A path, '\To_Product-Name', describes the rule how to obtain the value. As shown in FIG. 8A, the relation To_Product is followed from the node Items and the attribute Name is taken from there. Hence, the iterator can iterate over items and their associated products in lockstep.

In a path the component name of the result node can be separated using a dash ("-"). Components of substructures can also be separated by a dash as shown in the code snippet 830 of FIG. 8B. While virtual attributes can offer a concise notation, they generally only hide the complexity of a key access to an Internal Table rather than actually avoiding such complexity.

Virtual attributes lead to the question how to handle a relation having no target for a specific source instance. In general, virtual attribute advantageously behaves like a normal attribute from the perspective of a consumer of an iterator. For example, null-values should not occur. A fallback default value can be specified as shown in the code snippet 900 of FIG. 9A. If no default value is given, the initial value for the corresponding data type of the attribute can be taken. Attributes can also be bound directly to a constant value, for example as shown in the code snippet 930 of FIG. 9B. The iterator instance can provide memory for the (fallback) value and can copy the specified value, which can also be in a variable, into that memory at creation time.

Upon creation of the iterator object, it is not yet assigned to any instance of the node. An attempt to access an attribute would lead to an exception. It is possible to enquire the current state, for example as shown in the code snippet 1000 of FIG. 10A. The referenced instance of an iterator can be set via a FOR EACH statement, for example as shown in the code snippet 1030 of FIG. 10B. The iterator is unassigned at the ENDFOR statement.

It is usually not meaningful to write something like lo_iter_max=lo_iter in order to obtain a permanent reference to the node instance currently pointed to by lo_iter. In this case, the iterator reference variable lo_iter_max would refer to the iterator object, which is used in the FOR EACH statement. Hence, the node instance pointed to will change in the next iteration, and after the ENDFOR the iterator is not assigned. FIG. 10C shows a code snippet 1060 illustrating a how such an effect can be realized. While an iterator can be used in a FOR EACH statement, an iterator used in this matter is immutable. This means that it is not possible to re-assign it while it is in use of the FOR EACH statement.

An unassigned iterator can include a reference to the mesh specified ("MESH LIKE") in the creation of the iterator, but generally only for the technical reason to have the mesh type. An assigned iterator, however, generally includes a real reference to a mesh instance. An iterator may be assigned to a node instance of another mesh only if the new mesh is compatible to the previous one. FIG. 10D shows a code snippet 1090 illustrating aspects of an approach for determining whether two iterators are assigned to the same node instance, even if the iterator objects are not the same.

After an assignment, the concrete iterator variable can be used to read the instance attributes in a type-safe fashion, such as, for example, using the functions lo_iter_itm→prod_name. A field-symbol can be assigned to the node attribute in the mesh where the iterator attribute points. Thus, the field-symbol does not change in the next iteration step. In the example of a garbage collection run, the field-symbol can keep the node alive, but not the whole mesh. The attribute can be supplied as an importing parameter to a method, but not as a changing parameter. Likewise, GET REFERENCE OF works in a corresponding manner.

An iterator allows access to the bound attributes. For accessing other attributes of the node to which the iterator is bound, a reference to the mesh object containing the node has to be available in the current scope. Two possible methods to access a complete node instance are illustrated in the code snippets 1100 and 1130 of FIG. 11A and FIG. 11B. FIG. 11A shows how a reference to the table line where the iterator lo_iter is assigned can be retrieved. If the table line type is known, the reference can be narrow-casted. Otherwise, a generically typed field-symbol can be assigned to the table line and its components can be accessed via dynamic ASSIGN. For thin nodes, a copy of the table line into a convertible work area, for example, as shown in FIG. 11B, can be more suitable. The availability of the mesh object can be required to ensure that it is not possible to gain additional attributes out of an iterator. Such a feature can be important for the use case of public and private attributes in a mesh.

The reference returned by a method get_instance can always include a reference to a read-only object. In ABAP, this aspect can only be checked at runtime, because there is no concept of a reference to a read-only data structure in the compiler. The FOR EACH statement differs from the LOOP statement in a way that there is no defined order in which the lines are processed. The rationale for this is that the determination decreases performance and a parallelized execution will only be possible if there is no expectation of the order.

The addition NODE ORDER can be specified to provide the same order as a LOOP. This approach can be especially useful if the mesh was created by an ABQL (Advanced Business Query Language, available from SAP AG of Walldorf, Germany) statement with an ORDER BY clause. The code snippet 1160 of FIG. 11C illustrates an example of this feature.

Filtered iteration on Internal Tables can include a WHERE condition on the line type. Filtered iteration on meshes can generalize this WHERE condition to path expressions, making use of the defined relations to navigate between nodes. A selector describes a rule to select a set of node instances and can include rules regarding what should be selected and the mesh on which the selection should be performed. Additionally a selector can have parameters, which can be supplied afterwards. The selection rule can be specified by a path, and the selector can be seen as a compiled path. The selection can be performed in the FOR EACH iteration, for example as shown in the code snippet 1200 of FIG. 12A, which depicts the creation of the selector object into the reference lo_selector. The path given to the parameter iv_path starts at the node Header, filters only to the instance with the ID 4711 and follows the relation Items. The reference lo_iter is the iterator variable through which the selected (item) instances pass. If from the domain data model it is known that there is at most one match in a selection, one can assign it directly to a bound iterator, for example as shown in the code snippet 1230 of FIG. 12B. If there is more than one match in the selection, an exception can be raised.

Path expressions consistent with implementations of the current subject matter can include various syntax and evaluation rules as described below. The basic unit of path is a step. Consistent with implementations of the current subject matter, a step can start with a backslash followed by a relation and an optional filter. The filter is a logical expression on the node's attributes, for example enclosed in square brackets. The general evaluation model of a step starts with a subset of node instances. Then it selects all instances for which there is a link of the specified relation. Finally, only those nodes are kept for which the filter condition is satisfied.

Several of such steps can be combined into a relative path, such as for example: \Items\SubItems. For the evaluation of a relative path, a start node can be specified via an iterator. The relative path can be empty (e.g., it does not contain any steps). An absolute path is a node name (here: Header) prefixed with \\ with an optional filter followed by a relative path, such as for example: \\Header\Items\SubItems. The given node name serves as the start node for the evaluation. The absolute path therefore is self-contained.

After a node name and a relation name a filter can be specified, for example: \\Header [ID=N'4711']\Items [Status=C'open']. A filter can be any kind of Boolean expression evaluating the node's attributes. In its most simple implementation, a filter can be a conjunction of equality expressions.

Because selection conditions usually contain variables, offering only the possibility to create a selector out of a path string may not be satisfactory. An example of such a selection condition is: \\Header [Date=:mv_today]\Items [status=: mv_status]. In this example, the concrete values of the variables mv_today and mv_status are not yet specified when creating the selector object. Such an approach requires subsequent method calls to set its variables to actual values before it can be used for a selection. To distinguish variables from node attributes they can be prefixed by a colon (":").

A mesh and an absolute path can be necessary to create an absolute selector, for example, as shown in the code snippet 1300 of FIG. 13A, which depicts the creation of an absolute selector object. A reference to it is stored in the variable lo_sel_item. The creation requires an absolute path, provided as a text literal, as well as a reference to a mesh object, given by lo_mesh.

A reference to the supplied mesh instance can be stored in the selector object. In contrast, the iterator object stores the mesh type ("MESH LIKE"). Using this approach, the mesh object does not have to be specified again when performing the selection (e.g., "FOR EACH"). If one selector is used for multiple mesh instances, a method to exchange the mesh instance of a selector can be executed as shown in the example code snippet 1330 of FIG. 13B. The new mesh has the same mesh type as the original one.

A selector can be used instead of merely using paths consistent with previous approaches, for example to improve performance for the "nested for each" case. For instance, we would like to print a hierarchical list of sales order headers with their items. This is not possible with one path expression only. Instead, two nested FOR EACH loops are required, for example as shown in the code snippet 1400 of FIG. 14. FIG. 14 depicts a nested FOR EACH with two selectors. As the iteration proceeds, the selected header node instances pass through the iterator object lo_iter_header. Each time the inner FOR EACH is entered, the node instance referenced by lo_iter_header is used as start iterator (in combination with the relative path) to perform the selection of the relative selector in lo_item_sel. In this way, the "item" node instances of one "header" node pass through lo_iter_item. At selector creation time, the start iterator is not yet assigned.

If a path contains variables, the selector object can store the actual values. This means that the specific variables' values are copied into the selector at assignment time. Using a path with variables within a selector requires the corresponding selector class definition inheriting from cl_mesh_absolute_selector or cl_mesh_relative_selector, respectively.

The variables can be added as instance attributes ("DATA"), for example, as shown in the code snippet 1500 of FIG. 15, which depicts the definition of a specific selector for an absolute path. The variable mv_id is defined in the class as an attribute, used in the path as a variable, and set before the iteration. The definition of a constructor is not necessary. Instead, the constructor is inherited from the parent class.

To make the usage of a selector with variables even more convenient, a design pattern with a setter-method "where" returning a reference to the object itself can be used, such as for example as shown in the code snippet 1600 of FIG. 16A, which depicts the implementation of a method "where" defined to set the instance attributes mv_id. With such a method, the selector's variables can be set more elegantly in the FOR EACH statement—which improves the readability and therefore the maintainability, such as for example as shown in the code snippet 1630 of FIG. 16B.

Figure 17:
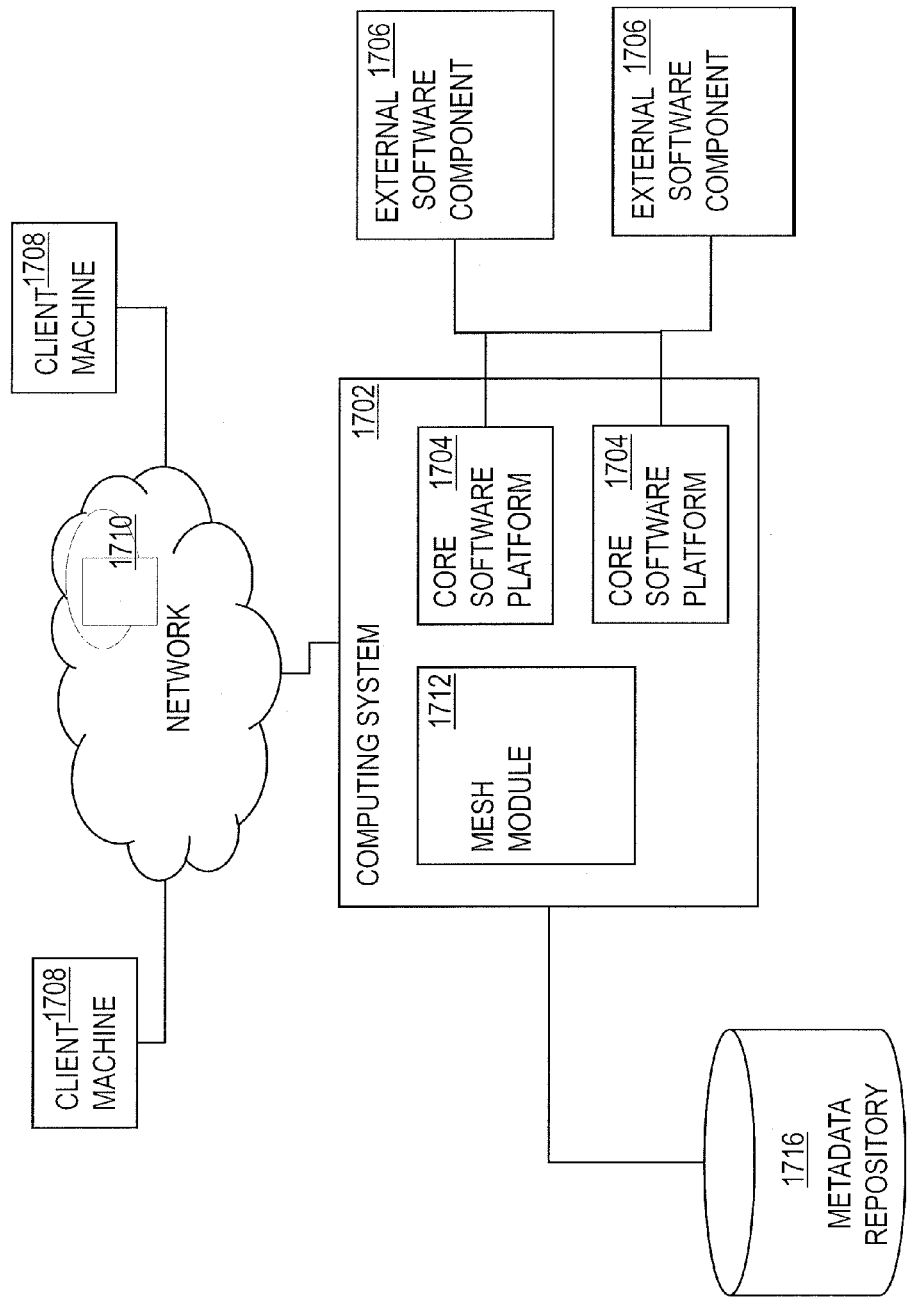
FIG. 17 shows a diagram illustrating aspects of a system showing features consistent with implementations of the current subject matter.

The core software platform of an enterprise resource planning (ERP) system, other business software architecture, or the like can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 17 shows a diagram of a system consistent with such an implementation. A computing system 1702 can include one or more core software platform modules 1704 providing one or more features of the business software system. The computing system can also aggregate or otherwise provide a gateway via which users can access functionality provided by one or more external service providers 1706. Client machines 1708 can access the computing system, either via a direct connection, a local terminal, or over a network 1710 (e.g. a local area network, a wide area network, a wireless network, the Internet, or the like). A mesh module 1712 can be hosted on the computing system 1702 or alternatively, on an external system accessible over a network connection. The mesh module 1712 can optionally include one or more discrete software and/or hardware modules that perform operations such as those described herein.

The mesh module 1712 can access one or more metadata repositories and/or other data repositories 1716 (e.g. process repositories, scenarios repositories, transactional data repositories, etc.) that can store definitions of business scenarios, business processes, and one or more business configurations as well as data, metadata, master data, etc. relating to definitions of the business scenarios, business processes, and one or more business configurations, and/or concrete instances of the data objects (e.g., business objects) that are relevant to a specific instance of the business scenario or a business process. In some examples, the definition can optionally be stored as a business object. In some implementations, the business object can include a template definition of a standard business process. The template definition that can optionally be modified via one or more extensions that are stored in the one or more metadata repositories 1716.

Smaller organizations can also benefit from use of business software functionality. However, such an organization may lack the necessary hardware resources, IT support, and/or consulting budget necessary to make use of a standalone business software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as, for example, a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 18:
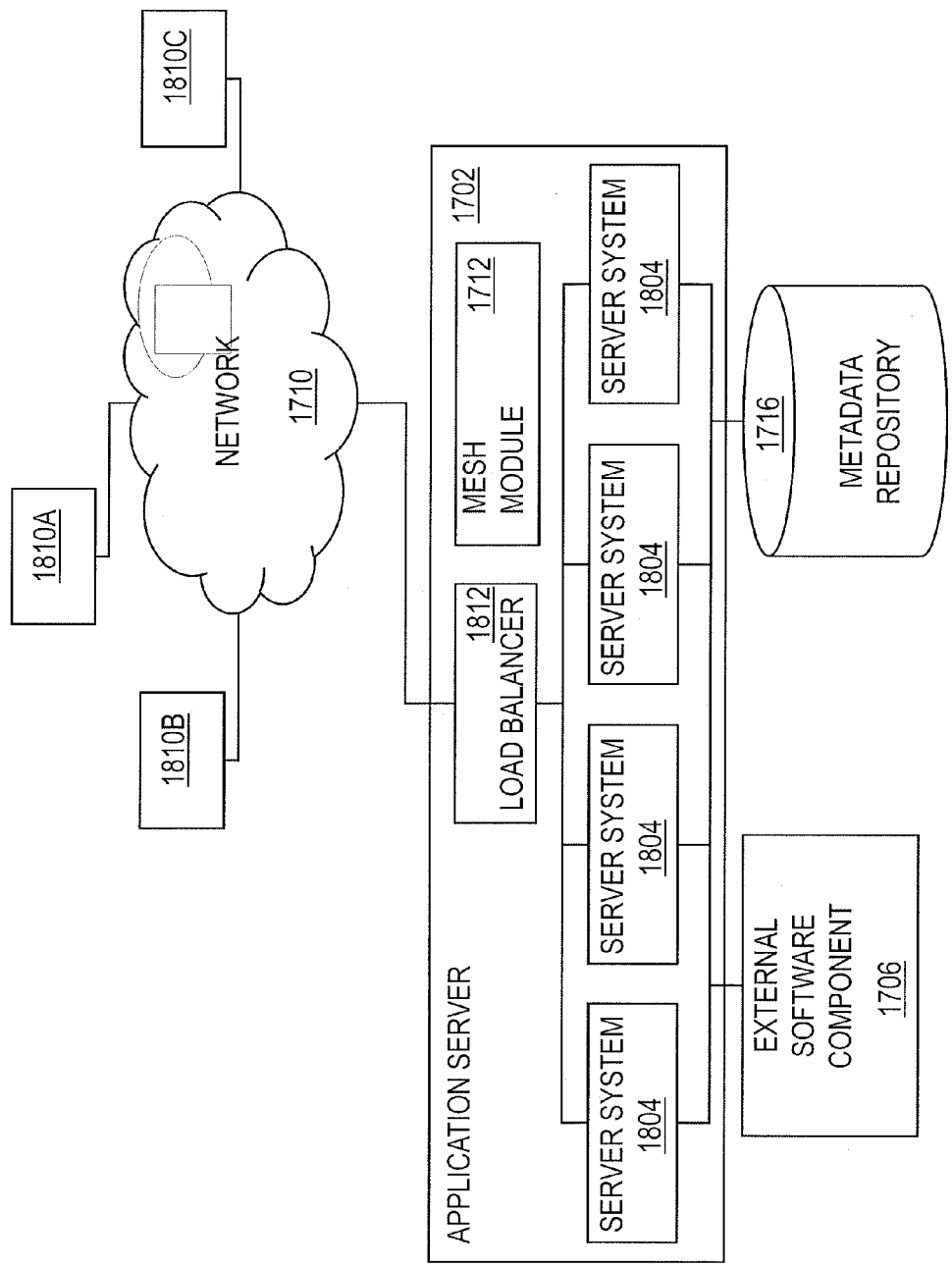
FIG. 18 shows a diagram illustrating aspects of another system showing features consistent with implementations of the current subject matter.

FIG. 18 shows a block diagram of a multi-tenant implementation of a software delivery architecture 1800 that includes an application server 1802, which can in some implementations include multiple server systems 1804 that are accessible over a network 1806 from client machines operated by users at each of multiple organizations 1810A-1810C (referred to herein as "tenants" of a multi-tenant system) supported by a single software delivery architecture 1800. For a system in which the application server 1802 includes multiple server systems 1804, the application server can include a load balancer 1812 to distribute requests and actions from users at the one or more organizations 1810A-1810C to the one or more server systems 1804. Instances of the core software platform 1704 (not shown in FIG. 18) can be executed in a distributed manner across the server systems 1804. A user can access the software delivery architecture across the network using a thin client, such as for example a web browser or the like, or other portal software running on a client machine. The application server 1802 can access data and data objects stored in one or more data repositories 1716. The application server 1802 can also serve as a middleware component via which access is provided to one or more external software components 1706 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 1802 that includes multiple server systems 1804 that handle processing loads distributed by a load balancer 1812. Potential benefits from such an arrangement can include, but are not limited to, high and reliably continuous application server availability and minimization of unplanned downtime, phased updating of the multiple server systems 1804 to permit continuous availability (one server system 1804 can be taken offline while the other systems continue to provide services via the load balancer 1812), scalability via addition or removal of a server system 1804 that is accessed via the load balancer 1812, and de-coupled lifecycle processes (such as for example system maintenance, software upgrades, etc.) that enable updating of the core software independently of tenant-specific customizations implemented by individual tenants.

As in the example illustrated in FIG. 17, the metadata repository 1716 can store a business object that represents a template definition of a standard business process. Each individual tenant 1810A-1810C can customize that standard template according to the individual business process features specific to business of the organization to which that tenant is assigned. Customizations can be stored as extensions in the metadata repository.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by a system comprising at least one programmable processor, cause the system to perform operations comprising:
    storing, in a mesh structure comprising a single data object implemented natively within a business programming language, semantically grouped data from a plurality of nodes of two or more business objects;
    providing, via the mesh structure, a working area that is processed with statements in the business programming language to implement one or more core services directly from the mesh structure;
    supporting links between two or more nodes of the plurality of nodes via coded path expressions that are included in a definition of the mesh structure; and
    allowing retrieval, from a relational database underlying the two or more business objects, of data from the plurality of nodes of the two or more business objects via the mesh structure.

2. A computer program product as in claim 1, wherein the business programming language comprises ABAP, the Advanced Business Programming Language.

3. A computer program product as in claim 1, wherein the mesh structure stores the semantically grouped data in application memory during runtime.

4. A computer program product as in claim 1, wherein the one or more core services are implemented directly at a mesh level of the mesh structure without requiring an additional processing framework coded on top of the mesh structure.

5. A computer program product as in claim 1, wherein the one or more core services comprise an iterator function.

6. A computer program product as in claim 1, wherein the one or more core services comprise a selector function.

7. A system comprising:
   at least one programmable processor; and
   a machine-readable medium storing instructions that, when executed by the at least one processor, cause the at least one programmable processor to perform operations comprising:
   storing, in a mesh structure comprising a single data object implemented natively within a business programming language, semantically grouped data from a plurality of nodes of two or more business objects;
   providing, via the mesh structure, a working area that is processed with statements in the business programming language to implement one or more core services directly from the mesh structure;
   supporting links between two or more nodes of the plurality of nodes via coded path expressions that are included in a definition of the mesh structure; and
   allowing retrieval, from a relational database underlying the two or more business objects, of data from the plurality of nodes of the two or more business objects via the mesh structure.

8. A system as in claim 7, wherein the business programming language comprises ABAP, the Advanced Business Programming Language.

9. A system as in claim 7, wherein the mesh structure stores the semantically grouped data in application memory during runtime.

10. A system as in claim 7, wherein the one or more core services are implemented directly at a mesh level of the mesh structure without requiring an additional processing framework coded on top of the mesh structure.

11. A system as in claim 7, wherein the one or more core services comprise an iterator function.

12. A system as in claim 7, wherein the one or more core services comprise a selector function.

13. A computer-implemented method comprising:
   storing, in a mesh structure comprising a single data object implemented natively within a business programming language, semantically grouped data from a plurality of nodes of two or more business objects;
   providing, via the mesh structure, a working area that is processed with statements in the business programming language to implement one or more core services directly from the mesh structure;
   supporting links between two or more nodes of the plurality of nodes via coded path expressions that are included in a definition of the mesh structure; and
   allowing retrieval, from a relational database underlying the two or more business objects, of data from the plurality of nodes of the two or more business objects via the mesh structure.

14. A computer-implemented method as in claim 13, wherein the business programming language comprises ABAP, the Advanced Business Programming Language.

15. A computer-implemented method as in claim 13, wherein the mesh structure stores the semantically grouped data in application memory during runtime.

16. A computer-implemented method as in claim 13, wherein the one or more core services are implemented directly at a mesh level of the mesh structure without requiring an additional processing framework coded on top of the mesh structure.

17. A computer-implemented method as in claim 13, wherein the one or more core services comprise an iterator function.

18. A computer-implemented method as in claim 13, wherein the one or more core services comprise a selector function.

19. A computer-implemented method as in claim 13, wherein at least one of the storing, the providing, the supporting, and the allowing is performed by a system comprising at least one programmable processor.

* * * * *